May 29, 1962 K. A. HARPER 3,037,063
FLUIDIZED CATALYTIC POLYMERIZATION PROCESS
Filed June 11, 1958

INVENTOR.
K.A. HARPER
BY Hudson & Young
ATTORNEYS

United States Patent Office 3,037,063
Patented May 29, 1962

3,037,063
FLUIDIZED CATALYTIC POLYMERIZATION PROCESS
Kenneth A. Harper, Bartlesville, Okla., assignor to Phillips Petroleum Company, a corporation of Delaware
Filed June 11, 1958, Ser. No. 741,330
10 Claims. (Cl. 260—683.15)

This invention relates to the catalytic polymerization of normally gaseous olefins to hydrocarbons boiling within and above the motor fuel boiling range.

In one aspect, this invention relates to an improved process for the catalytic polymerization of normally gaseous olefins to hydrocarbons boiling within and above the motor fuel boiling range in a fluidized bed reactor wherein the temperature of said normally gaseous olefin feed stream is regulated to maintain substantially constant temperature within said reactor, the temperature of said normally gaseous olefin feed stream being maintained at a substantially lower temperature than the temperature within said fluidized bed reactor.

In another aspect, this invention relates to a method of control for a catalytic polymerization process wherein the temperature in the reactor is maintained substantially constant by regulating the heating of the normally gaseous olefin feed stream supplied to said reactor.

In another aspect, this invention relates to a control system for a catalytic polymerization process wherein the temperature in the reactor is maintained substantially constant notwithstanding variations in feed inlet temperature, feed flow rate, catalyst temperature, catalyst flow rate, proportions of various olefins in the feed stream, and total concentration of olefins in the feed stream.

In another aspect, this invention relates to an improved process for the catalytic polymerization of normally gaseous olefins to hydrocarbons boiling within and above the motor fuel boiling range in a fluidized bed reactor wherein the concentration of olefins in the olefin feed stream is maintained within a particular range.

Catalytic polymerization processes for the conversion of normally gaseous unsaturated hydrocarbons to hydrocarbons of high molecular weight and, especially for the conversion of hydrocarbon mixtures comprising different species of normally gaseous olefinic hydrocarbons to hydrocarbons boiling within and above the motor fuel boiling range in the presence of a solid polymerization catalyst, are well known in the art. It is known in the prior art to contact the feed stream with the solid catalyst in finely-divided form in a fluidized reaction zone. The use of the fluidized reaction zone permits uniform contacting conditions between the fluidized catalyst and the hydrocarbon feed to be maintained. Also, excellent heat transfer between the catalyst particles and the hydrocarbon feed is obtained in a fluidized bed reaction zone.

A fluidized catalytic polymerization process is not without its difficulties and problems. Variations in the temperature of the feed stream and fluidized catalyst supplied to the fluidized reaction zone, as well as variations in the rates of flow of the feed stream and fluidized catalyst, result in reduced yields with the formation of excessive carbonaceous deposits on the catalyst being obtained unless compensation is made for these factors. Also, variations in the concentration of olefins in the olefin feed stream supplied to the reactor result in wide variations of temperature in the reaction zone because of the exothermic nature of the polymerization reactions taking place. Variations in the proportions of the particular olefin hydrocarbons in the olefin feed stream also cause wide variations of temperature in the fluidized reaction zone, since the heat of reaction of propylene to form polymer is about 600 B.t.u. per pound of propylene while the heat of reaction of butylenes to form polymers is about 350 B.t.u. per pound of butylenes. Obviously, it is very desirable to maintain the temperature in the fluidized reaction zone substantially constant in order to obtain high yields of products with a desirable product distribution.

In polymerization processes wherein phosphoric acid type solid catalysts are used, corrosion is also a very serious problem when certain ranges of temperature are encountered. At temperatures in the range of about 250° F.–280° F., phosphate esters having a very corrosive effect on the metal structures and parts of the process equipment are formed. Therefore, it is very desirable in a fluidized polymerization process using this type catalyst that operation in this temperature range be avoided or at least minimized.

An object of this invention is to provide an improved catalytic polymerization process for the polymerization of normally gaseous olefins to hydrocarbons boiling within and above motor fuel boiling range in a fluidized bed reactor at substantially constant temperature to obtain improved yield and product distribution.

Another object of this invention is to provide an improved catalytic polymerization process for the polymerization of normally gaseous olefins to hydrocarbons boiling within and above motor fuel boiling range while maintaining the concentration of olefins in the olefin feed stream within a particular range.

Another object of this invention is to provide a method for controlling the temperature in the reactor of a catalytic polymerization process by regulating the heating of the olefin feed stream supplied to the reactor to obtain a temperature which is substantially below the temperature maintained in said reactor.

Another object of this invention is to provide a control system for maintaining the temperature in the reactor of a catalytic polymerization process constant by sensing variations in feed inlet temperature, feed flow rate, catalyst inlet temperature, proportions of individual olefins in the olefin feed stream, and total concentration of olefins in the feed stream.

An object of this invention is to provide an improved catalytic polymerization process for the polymerization of normally gaseous olefins to hydrocarbons boiling within and above the motor fuel boiling range using a phosphoric acid type solid catalyst wherein the polymerization reactions are conducted in such a manner as to avoid reaction temperatures in the range where corrosive phosphate esters are formed.

Other aspects, objects and the advantages of the invention are apparent from consideration of the accompanying description, the drawings and the appended claims.

According to the invention, there is provided an improved catalytic polymerization process of the fluidized type for the conversion of normally gaseous olefins into motor fuel boiling range components by maintaining constant temperature in the fluidized reaction zone nothwithstanding variations in temperature of the olefin feed stream, variations in temperature of the fluidized catalyst supplied to the reaction zone, variations in the concentration of olefins in the olefin feed stream, variations in the proportion of the individual olefins in the olefin feed stream, variations in the rate of flow of the olefin feed stream to the reaction zone, and variations in the rate of flow of the catalyst to the reaction zone. In the practice of this invention, the temperature of the olefin feed stream introduced into the fluidized reaction zone is maintained at a substantially lower temperature than the temperature maintained in the fluidized reaction zone and the heat necessary to raise the olefin feed stream to reaction temperature is supplied by heated fluidized catalyst, which in turn is heated by the heat of reaction. Further, in the practice of this invention, the concentration of olefins in the olefin feed stream can be maintained, when desired or required, substantially constant by the addition of a substantially olefin-free stream or diluent to the olefin feed stream supplied to the fluidized reaction zone. Still further, in the practice of this invention, the rate of flow of olefin feed streams supplied to the fluidized reaction zone is maintained substantially constant.

Also, according to the invention, there is provided a method and a control system employing said method for use in a fluidized polymerization process. The temperature in the fluidized reaction zone is determined by a first temperature responsive means and the temperature of the olefin feed stream supplied to the reaction zone is determined by a second temperature responsive means. A primary temperature controller operatively connected to said first temperature responsive means repositions the set point of a secondary temperature controller operatively connected to said second temperature responsive means. The secondary temperature controller regulates the preheating to which the olefin feed stream is subjected in a heat exchange means before introduction into the fluidized reaction zone. The secondary temperature controller is set to maintain the temperature of the olefin feed stream at a predetermined value which is substantially lower than the substantially constant temperature maintained in the fluidized reaction zone. Changes in temperature occurring in the reaction zone as a result of the reactions taking place in that zone are compensated for by the primary controller which readjusts the set point of the secondary controller to change the temperature at which the olefin feed stream enters the fluidized reaction zone. In this manner, the detrimental effect of control lag is substantially eliminated and the temperature in the fluidized reaction zone is maintained substantially constant.

In one embodiment of this invention, the preheating of the olefin feed stream supplied to the fluidized reaction zone is controlled by regulating the flow of olefin feed stream through the heat exchanger means employed for preheating the olefin feed stream. Thus, the output from the secondary temperature controller regulates the positioning of a control valve in a conduit means which by-passes the heat exchange means and thereby regulates the proportion of the olefin feed stream which is heated in the heat exchange means. In this embodiment, an extraneous source of heat can be supplied to the heat exchange means, for example, steam; however, preferably the effluent from the fluidized reaction zone is used as the heat exchange medium.

In another embodiment of this invention, preheating of the olefin feed stream supplied to the fluidized reaction zone is controlled by regulating the flow of heat exchange medium to the heat exchange means employed for preheating the olefin feed stream. Thus, the output from the secondary temperature controller regulates the positioning of a control valve in the conduit means supplying heat exchange medium to the heat exchange means in which the olefin feed stream is preheated. Although an extraneous source of heat exchange medium can be used in this embodiment, preferably effluent from the fluidized reaction zone is used as the heat exchange medium. If the reaction effluent is used as the heat exchange medium, the control valve regulated by the secondary controller is located in the conduit means which by-passes the heat exchange means so that only the proportion of effluent passing through the heat exchange means is changed without affecting the total flow of effluent from the reactor.

As a special feature of this invention, there is provided an olefin measuring means for determining the concentration of olefins in the olefin feed stream and a flow controller for the addition of non-olefin type hydrocarbons to the olefin feed stream to maintain the concentration of total olefins in the olefin feed stream substantially constant. Normally, the non-olefin stream is obtained from the process and serves as a recycle stream; however, a non-olefin stream from an extraneous source can also be used.

Figure 1:
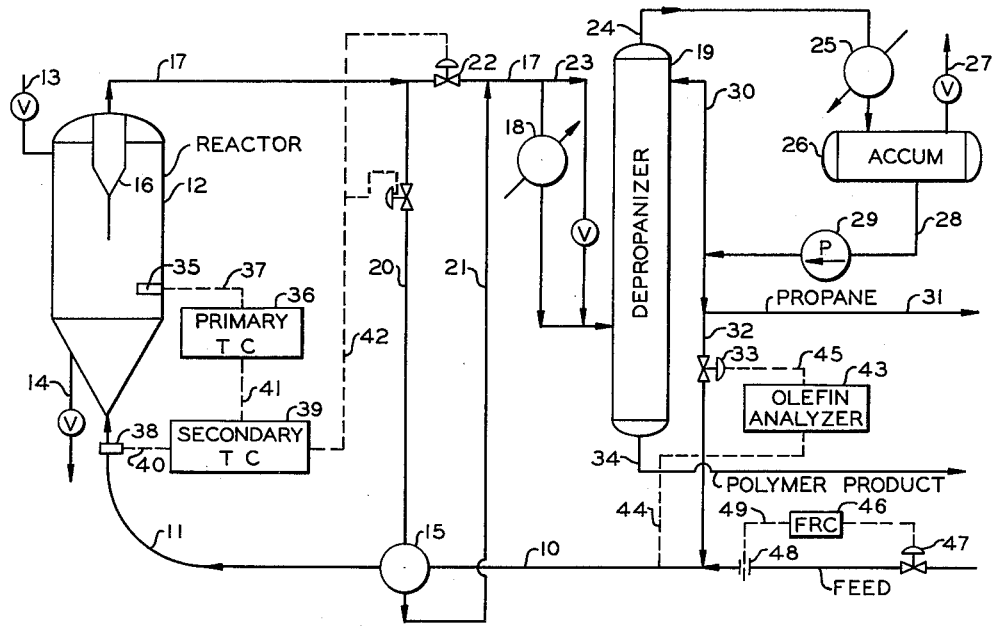
FIGURE 1 is a flow diagram illustrating diagrammatically an arrangement of apparatus of one embodiment of this invention wherein the preheating of the olefin feed stream is controlled by regulating the proportion of flow of the effluent from the fluidized reaction zone through the heat exchange means.

Referring to FIGURE 1, a feed stream containing olefins is introduced through conduits 10 and 11 into the bottom of fluidized reactor 12 for conversion into polymers boiling within and above the motor fuel boiling range. The catalyst within fluidized reactor 12 is maintained in the fluidized state with replacement catalyst being introduced through conduit 13 and spent catalyst being continuously withdrawn through conduit 14. The olefin feed stream flowing through conduits 10 and 11 is preheated by passing through heat exchange 15 wherein the feed stream is raised in temperature to a value which is substantially lower than the temperature prevailing within fluidized reactor 12. Within fluidized reactor 12, the fluidized catalyst, which has a temperature approximately the same as the temperature to be maintained in the reaction zone, serves to immediately heat the olefin feed stream up to reaction temperature. The reaction effluent is removed from fluidized reactor 12 through cyclone or separation means 16 by conduit 17 and passed through heat exchanger 18 to depropanizer tower 19. A portion of the reactor effluent, which is at an elevated temperature, is passed by means of conduits 20 and 21 through heat exchanger 15 to serve as heating medium for raising the temperature of the olefin feed stream supplied to fluidized reactor 12 through conduits 10 and 11. The proportion of the reactor effluent passing through conduits 20 and 21 to heat exchanger 15 is controlled by means of control valve 22. By-pass conduit 23 permits a portion of the reactor effluent passing through conduit 17 to be by-passed around heat exchanger 18 in order to produce the desired temperature in the reactor effluent before introduction into depropanizer tower 19.

In depropanizer tower 19, propane and lighter hydrocarbon products are removed overhead through conduit 24 and condensed in condenser 25 before passing into accumulator 26. Non-condensed gases are removed from accumulator 26 by conduit 27 and the liquid products are removed through conduit 28 by means of pump 29. A portion of the liquid withdrawn from accumulator 26 is passed through conduit 30 to the top of depropanizer tower 19 as reflux for depropanizer tower 19. A second portion of the liquid withdrawn from accumulator 26 is passed through conduit 31 and recovered as the propane product of the process. A third portion of the liquid from accumulator 26 is passed through conduit 32 into conduit 10 as diluent or recycle. Control valve 33 in conduit 32 regulates the flow of propane recycled into conduit 10. The produced polymer, comprising butanes and higher boiling compounds, is withdrawn from depropanizer tower 19 through conduit 34 as product of the process for further processing (not shown).

A temperature sensing means 35, preferably a thermocouple, is located in the fluidized reaction zone in reactor 12 for detecting the temperature within the reaction zone. Thermocouple 35 is operatively connected to primary temperature controller 36 by means of line 37. Temperature sensing means 38, preferably a thermocouple, is located in conduit 11 through which olefin feed stream passes before being introduced into fluidized reactor 12. Thermocouple 38 is operatively connected to secondary temperature controller 39 by line 40. The output of primary temperature controller 36 is operatively connected to secondary temperature controller 39 by means of line 41. The output of secondary temperature controller 39 is operatively connected to control valve 22 in conduit 17 by means of line 42.

Olefin analyzer 43 is operatively connected to conduit 10 by line 44 at a point downstream from the junction of conduit 32 with conduit 10. The output of olefin analyzer 43 is operatively connected to control valve 33 in conduit 32 by line 45. Olefin analyzer 43 can be any of the devices well known in the art and, preferably, is an infrared analyzer wherein the transmission of infrared radiation through a sample cell containing the hydrocarbon stream to be analyzed is electrically compared with the transmission of infrared radiation through a standard cell.

Flow rate controller 46 is operatively connected to control valve 47 located in feed stream conduit 10 to maintain the rate of flow through conduit 10 substantially constant in accordance with the pressure drop developed across flow restriction 48 located in conduit 10 and operatively connected by line 49 with flow controller 46.

In operation, an olefin feed stream is introduced into fluidized reactor 12 through conduits 10 and 11 and is heated by passage through heat exchanger 15 to a temperature at least 50° F. below the temperature prevailing in the fluidized reaction zone in fluidized reactor 12. Preferably, the temperature of the olefin feed stream entering reactor 12 is at least 100° F. below the temperature in the fluidized reaction zone and ordinarily the olefin feed stream is maintained at a temperature of 250° F. below the temperature in the fluidized reaction zone. Thermocouple 38 detects the temperature of the olefin feed stream entering reactor 12 and secondary temperature controller acts to maintain the desired temperature of the olefin feed stream by regulating the position of control valve 22 which adjusts the proportion of hot reactor effluent circulated through heat exchanger 15 in order to heat the olefin feed stream. The olefin feed stream, having a temperature substantially below the temperature prevailing in the fluidized reaction zone, contacts the fluidized catalyst which is at an elevated temperature and thereby immediately raises the temperature of the olefin feed stream to the desired reaction temperature which is to be maintained substantially constant in the fluidized reaction zone. Thermocouple 35 in the fluidized reaction zone determines the temperature prevailing there and primary temperature controller 36 adjusts the set point on secondary temperature controller 39 to thereby regulate the heat exchange in heat exchanger 34 by regulating the position of control valve 22 and thus maintain substantially constant temperature within the fluidized reaction zone. The use of thermocouples 35 and 38, together with primary temperature controller 36 and secondary temperature controller 39, maintains a substantially constant temperature within the fluidized reaction zone, while maintaining a substantial but varying difference in temperature between the reaction zone and the inlet to the reaction zone, with very little control lag. The use of a single thermocouple, such as thermocouple 35, would not permit the difference in temperature to be maintained and would result in considerable temperature fluctuations within the fluidized reaction zone because of the time lags in the process instrumentation.

The control system of this invention is particularly advantageous when using phosphoric acid type solid catalyst in the reaction zone because of the formation of phosphate esters at temperatures in the range of 250° F.–280° F. which have a very corrosive action on the usual structural metals. This corrosive action can be minimized using the control system of this invention by heating the olefin feed stream to a temperature to a point which is below the 250° F. temperature where corrosive phosphate esters are formed and then introducing the olefin feed stream at a temperature of below 250° F. into the fluidized reaction zone where the olefin feed stream is very rapidly raised through the range of 250° F.–280° F. to the reaction temperature by contact with the hot fluidized catalyst.

The polymerization reactions are carried out at a temperature in the range of 280° F.–430° F. when using a phosphoric acid type solid catalyst in the reaction zone. Preferably, a temperature in the range of 360° F.–400° F. is used. A pressure of 100–2,000 p.s.i. is maintained in the fluidized reactor and preferably the pressure is above about 700 p.s.i. The olefin feed stream is contacted with a catalyst at such a rate as to insure high olefin conversions and usually the feed rates are from about 0.1–2.5 volumes of liquid olefin per hour per volume of catalyst. Similar reaction condidtions, as is well known to those skilled in the art, are used when employing other types of fluidized catalyst suitable for polymerization processes.

The finely-divided catalyst useful in the practice of this invention may be any of the conventional solid polymerization catalysts that are well known to the art. For example, a catalyst comprising a major portion of silica and a minor portion, not more than 10 percent and generally between 0.5 and 5 percent by weight, of aluminum in the form of aluminum oxide is a very effective catalyst. Also, catalyst prepared by activating a hydrous silica gel with an aqueous solution of a hydrolyzable salt or some other metal, especially one selected from the group 3–b or from group 4–a of the periodic system, instead of with a solution of an aluminum salt, can also be used. Thus, a silica gel can be activated with a salt of indium, thallium, titanium, zirconium, beryllium, or thorium. Preferably, the catalyst is a phosphoric acid type catalytic material comprising an acid of phosphorous impregnated on a solid support, such as kieselguhr, silica gel, diatomaceous earth, alumina, activated carbon, and the like. Other catalysts, such as the metal phosphates, alkali halo-aluminates, and the like, can also be employed. Ordinarily, the catalyst particles have diameters in the range of from about 20 to about 180–300 microns and preferably have diameters in the range from about 20–120 microns.

The olefin feed streams treated in the present invention include the normally gaseous olefins, such as ethylene, propylene, butylenes, and the higher olefins, such as pentylenes and hexylenes. Preferably, the olefin feed stream contains olefins in a concentration of from 15–50 volum percent with the remainder of the stream comprising primarily paraffinic hydrocarbons. Preferably, the olefin concentration of the feed stream introduced into the fluidized reactor 12 contains 30 volume percent olefins, and a particular feature of this invention is the provision of a control system which maintains a substantially constant concentration of olefins of this concentration in the feed stream. Feed streams containing less than 15 volume percent cannot be economically polymerized while the use of olefin feed streams containing olefins in a concentration much over 50 percent is attended with heat exchange and over-polymerization difficulties resulting in low yields and poor product distribution. Where an olefin stream containing olefins in an amount greater than 50 volume percent is available, the stream can be diluted with a diluent, such as a paraffin hydrocarbon, obtained from the polymerization unit or from an extraneous source. Thus, as shown in FIGURE 1, the overhead stream obtained from depropanizer 19 and comprising 96 volume percent propane is recycled as a diluent into the olefin feed stream supplied to reaction 12 through conduits 10 and 11. Olefin analyzer 43 determines the olefin concentration of the stream flowing in conduit 10 and positions control valve 33 in recycle line 32 to regulate the addition of this propane-rich stream into the olefin feed stream.

In order to further illustrate the operation of the control system of this invention, consider that the olefin content of the olefin feed stream has increased and also that the propylene to butylene ratio in the olefin feed stream has increased. Olefin analyzer 43 detects the increase in olefin concentration in the feed stream and adjusts valve 33 to recycle additional propane into conduit 10 in order to dilute the olefin feed stream to an olefin concentration of 30 volume percent. This addition of recycle assists in the reduction of temperature in reactor 12 resulting from the increased olefin concentration in the feed stream because the total volume of feed supplied to reactor 12 has been increased. However, the temperature of the olefin feed stream will still be too high upon entering reactor 12 because the propylene to butylene ratio has also increased and the heat of reaction of propylene to form polymers is about 600 B.t.u. per pound of propylene while the heat of reaction of butylene to form polymers is about 350 B.t.u. per pound of butylenes. With secondary temperature controller 39 acting in accordnace with the temperature detected by thermocouple 38 to maintain the temperature of the olefin feed stream introduced into the reactor 12 below the temperature of 250° F. where corrosive type phosphate esters are formed when using phosphoric acid type catalyst, primary temperature controller 36 detects the immediate rise in temperature in the fluidized reaction zone resulting from the increased propylene to butylene ratio and resets secondary temperature controller 39 so that control valve 22 is opened in order to reduce the flow of hot reactor effluent through heat exchanger 15 and thereby reduce the temperature of the olefin feed stream introduced into reactor 12.

Figure 2:
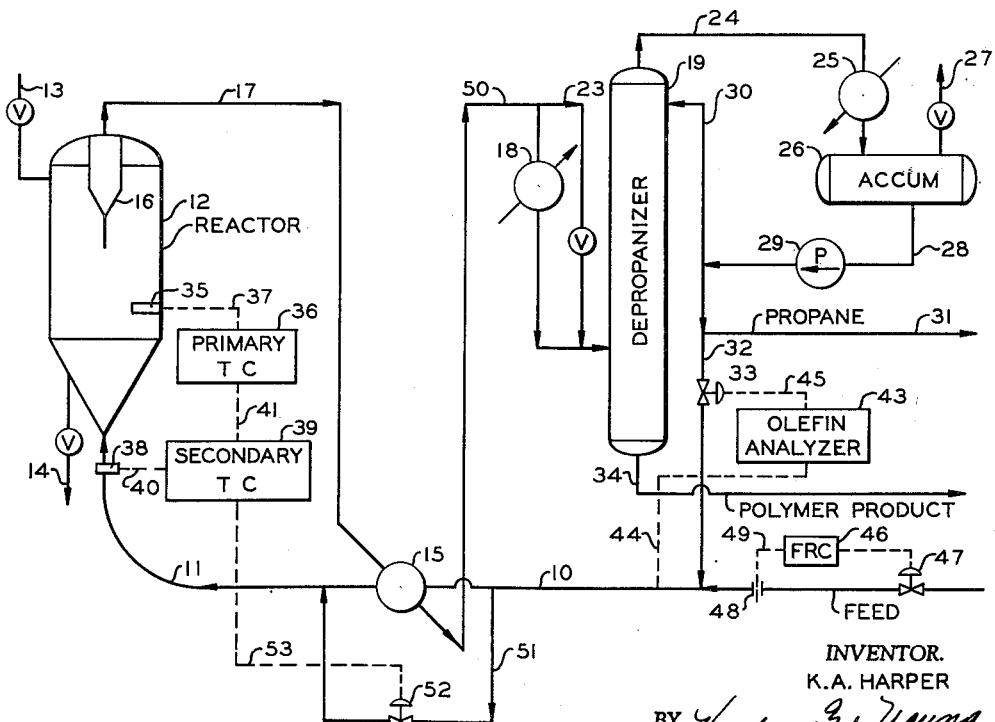
FIGURE 2 is a flow diagram illustrating diagrammatically an arrangement of apparatus of another embodiment of this invention wherein the preheating of the olefin fed stream is controlled by regulating the proportion of flow of the olefin feed stream through the heat exchange means.

The embodiment shown in FIGURE 2 of the drawings is very similar to the embodiment shown in FIGURE 1 and the same reference characters used in FIGURE 1 are also used for similar elements in FIGURE 2. As shown in FIGURE 2, all the reactor effluent discharged from reactor 12 flows through heat exchanger 15 by means of conduit 17 and then into depropanizer tower 19 through conduit 50. Conduit 51 provides a by-pass circuit around heat exchanger 15 for the flow of olefin feed stream through conduits 10 and 11 into reactor 12. Control valve 52 is operatively connected to secondary temperature controller 39 by means of line 53. The other elements of FIGURE 2 are the same as those described in FIGURE 1 and further description is not made here.

The operation of the control system shown in FIGURE 2 is very similar to the operation described for FIGURE 1 except that the preheating of the olefin feed stream supplied to reactor 12 is regulated by the proportioning of the flow of the olefin feed stream through heat exchanger 15 and by-pass conduit 51 in accordance with the positioning of control valve 52. Control valve 52 is regulated by secondary temperature controller 39 and primary temperature controller 36 in accordance with the temperatures detected by thermocouples 38 and 35. Since the operation of the control system of this invention has been fully described with respect to FIGURE 1, further description of the operation is not made here.

Although the control system of this invention has been described in combination with the use of an olefin analyzer to regulate the concentration of olefins in the olefin feed stream and a flow rate controller to regulate the rate of flow of the olefin feed stream to the polymerization unit, it will be apparent to those skilled in the art that substantially constant temperature can be maintained in the fluidized reaction zone by use of the primary and secondary temperature controllers as described in this invention without these other control features. Thus, variations in olefin concentration in the olefin feed stream can be compensated for by adjusting the degree of preheat supplied to the olefin feed stream upon detection of the change in temperature in the fluidized reaction zone. Similarly, changes in the rate of flow of olefin feed stream to the reactor resulting in variations in temperature in the fluidized reaction zone can be compensated for by changing the amount of heat supplied to the olefin feed stream in the preheat exchnage means. Of course, more efficient control results when using both the olefin analyzer and flow controller devices in combination with the primary and secondary temperature controllers and this combined control system is preferred.

*Example*

Reactor 12:
    Pressure, p.s.i.a. _____ 910
    Temperature, ° F. _____ 370
    Hourly volumes feed/volume catalyst _____ 1:1
    Catalyst—20 to 120 micron range solid catalyst comprising 80 percent phosphoric acid and 20 percent silica gel.

Feed 11 (includes diluent): Barrels/hour
    Propylene _____ 50
    Butylenes _____ 50
    Paraffins _____ 100
    Propane diluent _____ 100
    Volume percent olefins _____ 35
    Temperature in 11, ° F. _____ 120

Depropanizer 19:
    Pressure, p.s.i.a. _____ 288
    Temperature, ° F.—
        Top _____ 142
        Bottom _____ 225

Product yield 34: Barrels/hour
    Propylene _____ 3
    Butylenes _____ 3
    Paraffins _____ 100
    Polymer _____ 67

Reasonable variation and modification are possible within the scope of the foregoing disclosure, drawings and the appended claims to this invention, the essence of which is that there is provided an improved fluidized catalytic polymerization process wherein there is included a control method and a control system whereby substantially constant temperature is maintained within the fluidized reaction zone by regulating the preheating of the olefin feed stream supplied to said fluidized reaction zone, with the temperature of the olefin feed stream supplied to said fluidized reaction zone maintained at a variable but substantially lower temperature than said temperature maintained in said fluidized reaction zone, and, preferably, the olefin concentration in said olefin feed stream and the flow rate of said olefin feed stream are maintained substantially constant.

I claim:

1. In a polymerization process wherein a normally gaseous olefin feed stream is contacted with a solid catalyst comprising a supported phosphoric acid under reaction conditions in a fluidized reaction zone to form hydrocarbons boiling within and above the motor fuel boiling range, effluent from said reaction zone is passed to a distillation zone, and said hydrocarbons boiling within and above the motor fuel boiling range are recovered from said distillation zone, the improvement comprising maintaining the temperature in said fluidized reaction zone substantially constant by the steps comprising detecting the temperature in said fluidized reaction zone, detecting the temperature of said normally gaseous olefin feed stream, regulating the temperature of said normally gaseous olefin feed stream, in response to said detected temperature thereof, and overriding said regulating of said normally gaseous olefin stream in response to said detected temperature of said fluidzed reaction zone, the temperature of said normally gaseous olefin feed stream being regulated to below about 250° F.

2. In a polymerization process wherein a normally gaseous olefin feed stream is contacted with a solid catalyst comprising a supported phosphoric acid under reaction conditions in a fluidized reaction zone to form hydrocarbons boiling within the above the motor fuel boiling range, effluent from said reaction zone is passed to a distillation zone, and said hydrocarbons boiling within and above the motor fuel boiling range are recovered from said distillation zone, the improvement comprising passing at least a portion of said effluent from said reaction zone in heat exchange relation with at least a portion of said normally gaseous olefin feed stream to thereby raise the temperature of said normally gaseous olefin feed stream to below about 250° F. and maintaining the temperature in said fluidized reaction zone substantially constant at above about 280° F. by detecting the temperatures in each of said fluidized reaction zone and said normally gaseous olefin feed stream, regulating the exchange of heat of said effluent with said normally gaseous olefin feed stream in response to said detected temperature of said gaseous olefin feed stream, and overriding said step of regulating said heat exchange of said effluent and said gaseous olefin feed stream in response to said detected temperature of said fluidized reaction zone thereby minimizing the formation of corrosive phosphate esters in said fluidized reaction zone.

3. In a polymerization process wherein a normally gaseous olefin feed stream is contacted with a solid catalyst comprising a supported phosphoric acid under reaction conditions in a fluidized reaction zone to form hydrocarbons boiling within and above the motor fuel boiling range, effluent from said reaction zone is passed to a distillation zone, and said hydrocarbons boiling within and above the motor fuel boiling range are recovered from said distillation zone, the improvement comprising passing at least a portion of said effluent from said reaction zone in heat exchange relation with at least a portion of said normally gaseous olefin feed stream to thereby raise the temperature of said normally gaseous olefin feed stream to below about 250° F. and maintaining the temperature in said fluidized reaction zone substantially constant in the range between about 280° F. and 430° F. by detecting the temperatures in each of said fluidized reaction zone and said normally gaseous olefin feed stream, regulating the flow of said effluent in heat exchange relation with said normally gaseous olefin feed stream in response to said detected temperature of said gaseous olefin feed stream, and overriding said step of regulating said heat exchange of said effluent and said gaseous olefin feed stream in response to said detected temperature of said fluidized reaction zone, thereby minimizing the formation of corrosive phosphate esters in said fluidized reaction zone.

4. In a polymerization process wherein a normally gaseous olefin feed stream is contacted with a solid catalyst comprising a supported phosphoric acid under reaction conditions in a fluidized reaction zone to form hydrocarbons boiling within and above the motor fuel boiling range, effluent from said reaction zone is passed to a distillation zone, and said hydrocarbons boiling within and above the motor fuel boiling range are recovered from said distillation zone, the improvement comprising passing at least a portion of said effluent from said reaction in heat exchange relation with at least a portion of said normally gaseous olefin feed stream to thereby raise the temperature of said normally gaseous olefin feed stream to below about 250° F. and maintaining the temperature in said fluidized reaction zone substantially constant in the range between about 280° F. and 430° F. by detecting the temperatures in each of said fluidized reaction zone and said normally gaseous olefin feed stream, regulating the flow of said normally gaseous olefin feed stream in heat exchange relation with said effluent in response to said detected temperature of said gaseous olefin feed stream, and overriding said step of regulating said heat exchange of said effluent and said gaseous olefin feed stream in response to said detected temperature of said fluidized reaction zone, thereby minimizing the formation of corrosive phosphate esters in said fluidized reaction zone.

5. In a polymerization process wherein a normally gaseous olefin feed stream is contacted with a solid catalyst comprising a supported phosphoric acid under reaction conditions in a fluidized reaction zone to form hydrocarbons boiling within and above the motor fuel boiling range, effluent from said reaction zone is passed to a distillation zone, a bottoms fraction is recovered from said distillation zone as said hydrocarbons boiling within and above the motor fuel boiling range, and an overhead fraction comprising paraffinic hydrocarbon is recovered from said distillation zone and introduced into said normally gaseous olefin feed stream as recycle, the improvement comprising passing at least a portion of said effluent from said reaction zone in heat exchange relation with at least a portion of said normally gaseous olefin feed stream to thereby raise the temperature of said normally gaseous olefin feed stream to below about 250° F., maintaining the olefin content in said normally gaseous olefin feed stream substantially constant by regulating the rate of recycle of said overhead fraction from said distillation zone, and maintaining the temperature in said fluidized reaction zone substantially constant at above about 280° F. by detecting the temperatures in each of said fluidized reaction zone and said normally gaseous olefin feed stream, regulating the heat exchange relation between said effluent from said reaction zone and said normally gaseous olefin feed stream in response to said detected temperature of said gaseous olefin feed stream, and overriding said step of regulating said heat exchange of said effluent and said gaseous olefin feed stream in response to said detected temperature of said fluidized reaction zone, thereby minimizing the formation of corrosive phosphate esters in said fluidized reaction zone.

6. In a polymerization process wherein a normally gaseous olefin feed stream is contacted with a solid catalyst comprising a supported phosphoric acid under reaction conditions in a fluidized reaction zone to form hydrocarbons boiling within and above the motor fuel boiling range, effluent from said reaction zone is passed to a distillation zone, a bottoms fraction is recovered from said distillation zone as said hydrocarbons boiling within and above the motor fuel boiling range, and an overhead fraction comprising propane is recovered from said distillation zone and introduced into said normally gaseous olefin feed stream as recycle, the improvement comprising passing at least a portion of said effluent from said reaction zone in heat exchange relation with at least a portion of said normally gaseous olefin feed stream to thereby raise the temperature of said normally gaseous olefin feed stream to below about 250° F., maintaining the olefin content in said normally gaseous olefin feed stream substantially constant in the range between 15 and 50 volume percent by regulating the rate of recycle of said overhead fraction from said distillation zone, and maintaining the temperature in said fluidized reaction zone substantially constant in the range between about 280° F. and 430° F. by detecting the temperatures in each of said fluidized reaction zone and said normally gaseous olefin feed stream, regulating the flow of said effluent in heat exchange with said normally gaseous olefin feed stream in response to said detected temperature of said gaseous olefin feed stream, and overriding said step of regulating said heat exchange of said effluent and said gaseous olefin feed stream in response to said detected temperature of said fluidized reaction zone, thereby minimizing the formation of corrosive phosphate esters in said fluidized reaction zone.

7. In a polymerization process wherein a normally gaseous olefin feed stream is contacted with a solid catalyst comprising a supported phosphoric acid under reaction conditions in a fluidized reaction zone to form hydrocarbons boiling within and above the motor fuel boiling range, effluent from said reaction zone is passed to a distillation zone, a bottoms fraction is recovered from said distillation zone as said hydrocarbons boiling within and above the motor fuel boiling range, and an overhead fraction comprising propane is recovered from said distillation zone and introduced into said normally gaseous olefin feed stream as recycle, the improvement comprosing passing at least a portion of said effluent from said reaction zone in heat exchange relation with at least a portion of said normally gaseous olefin feed stream to thereby raise the temperature of said normally gaseous olefin feed stream to below about 250° F., maintaining the olefin content in said normally gaseous olefin feed stream substantially constant in the range between 15 and 50 volume percent by regulating the rate of recycle of said overhead fraction from said distillation zone, and maintaining the temperature in said fluidized reaction zone substantially constant in the range between about 280° F. and 430° F. by detecting the temperatures in each of said fluidized reaction zone and said normally gaseous olefin feed stream, regulating the flow of said normally gaseous olefin feed stream in heat exchange with said effluent in response to said detected temperature of said gaseous olefin feed stream, and overriding said step of regulating said heat exchange of said effluent and said gaseous olefin feed stream in response to said detected temperature of said fluidized reaction zone, thereby minimizing the formation of corrosive phosphate esters in said fluidized reaction zone.

8. In a polymerization process wherein a normally gaseous olefin feed stream is contacted with a solid catalyst comprising a supported phosphoric acid under reaction conditions in a fluidized reaction zone to form hydrocarbons boiling within and above the motor fuel boiling range, effluent from said reaction zone is passed to a distillation zone, a bottoms fraction is recovered from said distillation zone as said hydrocarbons boiling within and above the motor fuel boiling range, and an overhead fraction comprising propane is recovered from said distillation zone and introduced into said normally gaseous olefin feed stream as recycle, the improvement comprising passing at least a portion of said effluent from said reaction zone in heat exchane relation with at least a portion of said normally gaseous olefin feed stream to thereby raise the temperature of said normally gaseous olefin feed stream to below about 250° F., maintaining the olefin content in said normally gaseous olefin feed stream substantially constant in the range between 15 and 50 volume percent by regulating the rate of recycle of said overhead fraction from said distillation zone, maintaining constant rate of flow of said normally gaseous olefin feed stream prior to the point of introduction of said recycle of said overhead fraction into said normally gaseous olefin feed stream, and maintaining the temperature in said fluidized reaction zone substantially constant in the range between about 280° F. and 430° F. by detecting the temperatures in each of said fluidized reaction zone and said normally gaseous olefin feed stream, regulating the heat exchange between said effluent from said reaction zone and said normally gaseous olefin feed stream in response to said detected temperature of said gaseous olefin feed stream, and overriding said step of regulating said heat exchange of said effluent and said gaseous olefin feed stream in response to said detected temperature of said fluidized reaction zone, thereby minimizing the formation of corrosive phosphate esters in said fluidized reaction zone.

9. In a polymerization process wherein a normally gaseous olefin feed stream is contacted with a solid catalyst comprising a supported phosphoric acid under reaction conditions in a fluidized reaction zone to form hydrocarbons boiling with and above the motor fuel boiling range, effluent from said reaction zone is passed to a distillation zone, a bottoms fraction is recovered from said distillation zone as said hydrocarbons boiling within and above the motor fuel boiling range, and an overhead fraction comprising propane is recovered from said distillation zone and introduced into said normally gaseous olefin feed stream as recycle, the method of controlling the temperature in said fluidized reaction comprising, detecting the olefin content in said normally gaseous olefin feed stream, regulating the amount of said overhead fraction recycled from said distillation zone and introduced into said normally gaseous feed stream in accordance with the olefin content in said normally gaseous olefin feed stream to maintain the olefin content thereof in the range between 15 and 50 volume percent, passing at least a portion of said effluent from said reaction zone in heat exchange relation with at least a portion of said normally gaseous olefin feed stream to thereby raise the temperature of said normally gaseous olefin feed stream to below about 250° F., detecting the temperature of said normally gaseous olefin feed stream supplied to said fluidized reaction zone, regulating the exchange of heat of said effluent with said normally gaseous olefin feed stream in accordance with said temperature of said normally gaseous olefin feed stream, detecting the temperature in said fluidized reaction zone, and adjusting the regulating of said exchange of heat of said effluent with said normally gaseous olefin feed stream in accordance with said temperature detected in said fluidized reaction zone to maintain the temperature in said fluidized reaction zone in the range between about 360° F. and 400° F., thereby minimizing the formation of corrosive phosphate esters in said fluidized zone.

10. In a polymerization process wherein a normally gaseous olefin feed stream is contacted with a solid catalyst comprising a supported phosphoric acid under reaction conditions in a fluidized reaction zone to form hydrocarbons falling within and above the motor fuel boiling range, effluent from said reaction zone is passed to a distillation zone, a bottoms fraction is recovered from said distillation zone as said hydrocarbons boiling with and above the motor fuel boiling range, and an overhead fraction comprising propane is recovered from said distillation zone and introduced into said normally gaseous olefin feed stream as recycle, the method of controlling the temperature in said fluidized reaction zone comprising, detecting the olefin content in said normally gaseous olefin feed stream, regulating the amount of said overhead fraction recycled from said distillation zone and introduced into said normally gaseous olefin feed stream in accordance with the olefin content in said normally gaseous olefin feed stream to maintain the olefin content thereof in the range between 15 and 50 volume percent, detecting the rate of flow of said normally gaseous olefin feed stream at a point upstream from the point of introduction of said overhead fraction as recycle into said normally gaseous olefin feed stream, regulating the flow of said normally gaseous olefin feed stream at a point upstream from the point of introduction of said overhead fraction as recycle into said normally gaseous olefin feed stream in accordance with the flow rate detected so as to maintain substantially constant flow, passing at least a portion of said effluent from said reaction zone in heat exchange relation with at least a portion of said normally gaseous olefin feed stream to thereby raise the temperature of said normally gaseous olefin feed stream to below about 250° F., detecting the temperature of said normally gaseous olefin feed stream supplied to said fluidized reaction zone, regulating the exchange of heat of said effluent with said normally gaseous olefin feed stream in accordance with said temperature of said normally gaseous olefin feed stream, detecting the temperature in said fluidized reaction zone and adjusting the regulating of said exchange of heat of said effluent with said normally gaseous olefin feed stream in accordance with said temperature detected in said fluidized reaction zone to maintain the temperature in said fludized reaction zone in the range between about 360° F. and 400° F., thereby minimizing the formation of corrosive phosphate esters in said fluidized zone.

References Cited in the file of this patent
UNITED STATES PATENTS

| | | |
|---|---|---|
| 2,368,110 | Buell | Jan. 30, 1945 |
| 2,390,031 | Schutte et al. | Nov. 27, 1945 |
| 2,667,521 | Harney | Jan. 26, 1954 |
| 2,697,733 | Sweetser et al. | Dec. 21, 1954 |
| 2,824,149 | Corner et al. | Feb. 18, 1958 |
| 2,835,716 | Langlois et al. | May 20, 1958 |
| 2,881,235 | Van Pool | Apr. 7, 1959 |
| 2,908,734 | Cottle | Oct. 13, 1959 | ns
UNITED STATES PATENT OFFICE
CERTIFICATE OF CORRECTION

Patent No. 3,037,063

May 29, 1962

Kenneth A. Harper

It is hereby certified that error appears in the above numbered patent requiring correction and that the said Letters Patent should read as corrected below.

Column 9, line 19, for "the", first occurrence, read -- and --; column 11, lines 23 and 24, for "comprosing" read -- comprising --; line 59, for "exchane" read -- exchange --; column 12, lines 13 and 53, for "with", each occurrence, read -- within --; column 13, line 14, for "fludized" read -- fluidized --.

Signed and sealed this 13th day of November 1962.

SEAL)
Attest:

ERNEST W. SWIDER
Attesting Officer

DAVID L. LADD
Commissioner of Patents